United States Patent [19]

Schmözer et al.

[11] Patent Number: 4,458,054
[45] Date of Patent: Jul. 3, 1984

[54] HEAT-HARDENABLE CATIONIC WATER-DILUTABLE BINDERS

[75] Inventors: Gerhard Schmözer; Heiner Verdino; Wolfgang Daimer, all of Graz, Austria

[73] Assignee: Vianova Kunstharz, A.G., Werndorf, Austria

[21] Appl. No.: 443,456

[22] Filed: Nov. 22, 1982

[30] Foreign Application Priority Data

Nov. 26, 1981 [AT] Austria .................................. 5083/81

[51] Int. Cl.³ .............................................. C08L 63/02
[52] U.S. Cl. ................... 525/327.3; 528/121; 528/183; 528/185; 528/186; 528/187; 528/188; 528/341
[58] Field of Search ...................... 525/327.3; 528/121, 528/183, 185, 186, 187, 188, 341

[56] References Cited

U.S. PATENT DOCUMENTS 4,364,860 12/1982 Patzschke et al. ............... 525/327.3

OTHER PUBLICATIONS

Roberts et al., *Basic Principles of Organic Chemistry*, WA Benjamin Inc., NY, 1965, p. 561.

*Primary Examiner*—Maurice J. Welsh
*Attorney, Agent, or Firm*—A. W. Breiner

[57] ABSTRACT

Cationic heat-hardenable binders comprising polymers containing amine groups and a crosslinking component which is film-forming with the amine group containing polymer through transesterification at elevated temperatures are described. The binders which are water-dilutable upon protonization of the amine groups comprise (a) 60 to 95% by weight of a polymer having a hydroxyl value of from 40 to 450 mg KOH/g and an amine value of from 20 to 150 mg KOH/g, water-soluble or water-dilutable upon protonation of the basic groups, and (b) 5 to 40% by weight of a cross-linking component of the general formula

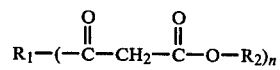

n having a value of from 1 through 5, $R_1$ being the moiety of a monoalcohol having from 1 to 8 C-atoms or of a polyol or of a polyamine or of a polyepoxy compound or of a polyisocyanate remaining after reaction with one or more carboxylic acid groups, and $R_2$ being a straight chain or branched alkyl radical with from 1 to 8 C-atoms.

The binders have excellent characteristics particularly when deposited from an electrodeposition system.

5 Claims, No Drawings

HEAT-HARDENABLE CATIONIC WATER-DILUTABLE BINDERS

FIELD OF INVENTION AND PRIOR ART

This invention is concerned with heat-hardenable cationic water-dilutable binders for the formulation of paints which can be applied according to known methods, particularly by electrodeposition. In particular, the invention is concerned with a curing system for the aforesaid binders, the crosslinking reaction of the curing believed to involve a transesterification reaction.

The crosslinking of water-soluble or water-dilutable paint binders through multi-esterification is disclosed in AT-PS Nos. 268,675 and 267,185. According to these references, crosslinking is limited to a specified class of resins, viz., adducts of alpha, beta-ethylenically unsaturated dicarboxylic acid anhydrides, such as maleic anhyride, with unsaturated oil fatty acids and derivatives thereof in combination with polyhydroxy compounds.

European Patent Application No. 0 012 463 A 1 discloses heat-hardenable coating compositions which crosslink on stoving through transesterification, in the presence of transesterification catalysts, of the hydroxy groups of one resin component free from acid groups and ethylenically unsaturated groups and of a polyester free from acid groups and containing more than one beta-hydroxy group. In case one of the resin components is a cationic water-dilutable resin, the system can be applied by electrodeposition. According to this reference, the beta-hydroxy groups particularly suited for a transesterification reaction are introduced through reaction of a polycarboxylic acid anhydride with glycols, glycolmonoethers, polyols and/or, preferably, with monoepoxides. The preferred polyesters carrying beta-hydroxy groups are those prepared from trimellitic acid anhydride and a glycidylester of a saturated aliphatic carboxylic acid with from 9 to 11 C-atoms, the carboxy group of which is attached to a tertiary C-atom. On crosslinking of the binders the glycols bound as beta-hydroxyesters are split off at stoving temperatures of from 150° to 200° C., preferably at 180° C., and are thus eliminated from the coating. This type of crosslinking agent—even if transesterification catalysts are used—requires relatively high stoving temperatures and has a high level of substances split off which is a substantial disadvantage. Furthermore, high-quality paint raw materials are split off and must be removed from the paint film. This is again a disadvantage for economic and ecological reasons.

AT-PS No. 356,779 discloses cathodically depositable coating compositions for electrodeposition, the binder consisting of a blend of a cationic resin carrying secondary and/or primary amine groups and a cross-linking component carrying carboxyl groups esterified with $C_1$-$C_6$-alkanols. According to this patent, cure of the deposited films is effected at above 160° C. through splitting off of the esterification alcohols from the cross-linking component and amide formation of the carboxy groups set free with the secondary and/or primary amine groups of the carrier resin. Products of the aforesaid type have the disadvantage in that in order to obtain a crosslinking density necessary for the film performance demanded by the consumer, the protonized carrier resin must have a relatively large number of secondary or primary amine groups for amide formation. These groups, however, have a substantial influence on the deposition behavior at electrodeposition, their amount being thus reduced to a relatively small range.

OBJECTS AND GENERAL DESCRIPTION OF INVENTION

It has now been found that it is possible to overcome the disadvantages of the products known in the prior art through a specific selection of the carrier resin, i.e., the water-dilutable cationic resin, as well as of the crosslinking component.

The present invention is, therefore, directed to heat-hardenable cationic binders, water-dilutable upon protonation of the amine groups, comprising blends of amine group carrying polymers and a crosslinking component which is film-forming with the polymer through transesterification at elevated temperature comprising 60 to 95% by weight of a polymer, water-soluble or water-dilutable upon protonation of the basic groups, having a hydroxyl value of from 40 to 450 mg KOH/g and an amine value of from 20 to 150 mg KOH/g, and (b) 5 to 40% by weight of a cross-linking component of the general formula —

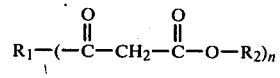

n having a value of between 1 and 5, $R_1$ being the moiety of a monoalcohol with from 1 to 8 C-atoms or of a polyol or of a polyamine or of a polyepoxy compound or of a polyisocyanate remaining after reaction with one or more carboxylic acid groups, and $R_2$ being a straight chain or branched alkyl radical with from 1 to 8 C-atoms.

The invention is further concerned with a process of crosslinking polymers with the aforesaid crosslinking agent, water-soluble or water-dilutable upon protonation of their basic groups and having a hydroxyl value of from 40 to 450 mg KOH/g.

In comparison with the products made in accordance with EP No. 0 012 463, the binder systems of the invention show essential advantages. Through the possibility of using low molecular weight aliphatic monoalcohols, the losses on baking, i.e., the quantity of the substances split off on crosslinking, is dramatically reduced. Furthermore, the type of substances split off are of the same class of compounds normal for other curing mechanisms in the paint industry and, therefore, are neither new nor extraordinary environmental or economic handicaps. The binders of the invention, even without additional catalysts, can be cured at from 160°–180° C. to provide films with excellent performance characteristics.

In contradistinction to the products made in accordance with AT-PS No. 356,779, the binders of the present invention can be formulated as electrodeposition paints, optimized within a broad range regarding electrical properties, such as deposition voltage, throwing power, or film resistance, as well as regarding crosslinking density and thus corrosion protection and mechanical properties.

Suitable components (a), as above defined, are, in principle, any of the polymers containing basic groups which are water-soluble or water-dilutable upon protonation of their basic groups and are those recommended for the formulation of electrodeposition paints, as long as they have a hydroxyl value of between 40 and 450 mg KOH/g. Their amine number, normally lying between 20 and 150 mg KOH/g, should substantially come from tertiary amine groups. Protonizable polymers suitable for the present invention are described in the literature, for example R. H. Chandler, *Advances In Electropainting*, Edition R. H. Chandler, Ltd. Among the useful polymers are copolymers carrying protonizable groups either through the use of suitable monomers or through subsequent modification. Polyester resins, suitably modified, or adducts may also be used. Modified epoxy resins are a preferred group of basic polymers, with special emphasis on epoxy resin amine adducts.

The most preferred type of component (a) are adducts of aliphatic or cycloaliphatic amines and/or alkanolamines to glycidylethers of 2,2-bis-(4-hydroxyphenyl)propane of the general formula —

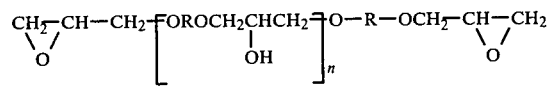

wherein R = 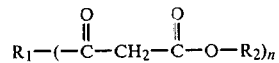, and n is a number between 1 and 5.

Also, glycidyl ethers of novolaks with the general formula —

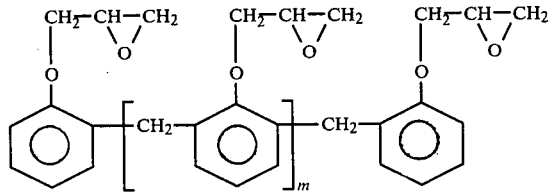

are suitable for use in this invention, wherein m is a number between 0 and 3. Small quantities of glycidylethers of divalent alcohols may be used to modify the above-mentioned glycidylethers, for example polypropyleneglycol diglycidylether or polyethyleneglycol diglycidylether.

In the preparation of component (a), the glycidyl functional groups of these epoxy compounds are reacted in known manner with amines and alkanolamines carrying secondary amine groups to give addition compounds. The weight ratios and the reaction conditions are chosen in order that the addition product contains no substantial quantities of epoxy groups or low molecular amines. Useful secondary amines include dimethylamine, diethylamine, dibutylamine and diethanolamine, diisopropanolamine, N-methylethanolamine, morpholine and dicyclohexylamine. Optionally, in mixture with the secondary monoamines, di-secondary diamines such as N,N'-diethylpropanediamine-1,3 or primary amines may be used, with the consequence that these difunctional compounds are able to link the epoxy resins and thus cause growth of the molecules. Useful primary amines include the primary-tertiary diamines such as N,N'-dimethylaminopropylamine and N,N'-diethylamino-propylamine.

Adduct formation between amine compound and epoxy compound is preferably carried out in the presence of inert solvents such as alcohols and glycol monoethers at temperatures of between 40 and 140° C. until the amine compound has substantially reacted. In some cases it is advantageous to flexibilize the basic polymers through the introduction of aliphatic side chains. This may be achieved through reaction of a hydroxy-rich polymer with ε-caprolactone or with glycidylesters of aliphatic monocarboxylic acids. Although the reaction mechanism is not fully understood, it can be assumed that ester-like or ether-like linkages are formed.

Suitable components (b), as above identified, used for the binders of the present invention are crosslinking components of the general formula —

$$R_1-(-\overset{O}{\underset{\|}{C}}-CH_2-\overset{O}{\underset{\|}{C}}-O-R_2)_n$$

n being a whole number of between 1 and 5, $R_1$ being a radical of a monoalcohol with from 1 to 8 C-atoms or of a polyol or of a polyamine or of a polyepoxy compound or of a polyisocyanate remaining after reaction with one or more carboxylic acid groups, and $R_2$ being a straight chain or branched alkyl radical with from 1 to 8 C-atoms.

As can be seen from the general formula, in the most simple case, component (b) is a diester of malonic acid with low molecular weight alcohols. It has been found that optimal properties are attained as regards reactivity, and thus lower stoving temperatures, when malonic acid is used. This can be deducted from the special state of malonic acid and the mutual activation of its carboxy and ester groups. Suitable esterification alcohols are straight chain or branched monoalcohols with from 1 to 8 C-atoms, the preferred ones being methanol, ethanol, and propanols. With alcohols having more than 3 C-atoms it is advantageous from the standpoint of easier split off to have substituents with a negative field effect. Such substituents may be, for example, halogen atoms, $-N^+R_3-COOR$ or $-O-CH_3$-groups (note, for example, B. H. Beyer, *Lehrbuch der Organischen Chemie*). In the use of the esters according to the present invention it is of advantage that they have a boiling point of above 200° C. Optionally, stoving losses of the paint films may be compensated by employing higher levels.

In a preferred embodiment of the invention, the crosslinking components are polyfunctional and/or higher molecular weight esters. In such an embodiment, $R_1$ stands for a radical resulting from the esterification of a carboxy group with a polyol. The other hydroxy functions of the polyol are partially or totally esterified with a monocarboxylic acid of the type —

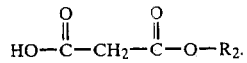

The polyols may either be defined compounds such as the glycols, glycerol, trimethylolethane, trimethylolpropane, trimethylolhexane, or low molecular weight polyesters or polymers with chain end hydroxy groups. In an analogous manner polyamines such as ethylene diamine or hexamethylene diamine can replace the polyols in these higher functional crosslinking components whereby, analogous to the ester linkage, an acid amide linkage is formed.

The simple malonic acid diesters are available and are produced according to known methods. When preparing esters with higher functionality, it is preferred to transesterify simple diesters with the polyols, optionally in the presence of catalysts. The weight ratios between the reaction partners are chosen in order that per mole of diester preferably one mole hydroxy group of the polyol is used. The alcohol set free upon the partial transesterification is preferably distilled off. The partial transesterification of the diester is carried out at temperatures of up to 180° C. until preferably all hydroxy groups are consumed which means until a hydroxyl value of the reaction product of below 20 mg KOH/g is attained. The use of inert solvents may be desirable in some cases but is not essential. In the case of remaining unreacted remnants of the reaction partners, these are preferably removed, for example, through vacuum distillation. In an analogous manner, when reacting a polyamine with simple diesters, the alcohol splits off with partial transamide formation. To have the desired hardening effect, the molecular weight of the polyfunctional crosslinkers should not supersede a value of about 5000. Index n in the general formula should lie between 2 and 5.

For preparing the binder systems of the present invention, 60-95 parts of component (a) are mixed with 5-40 parts of component (b). In order to render the coating composition water-soluble, it is necessary to at least partially neutralize the amine groups with preferably organic acids. Suitable acids include formic acid, acetic acid, and lactic acid. The paints prepared with the binders of the present invention may contain additional solvents, pigments, and normal paint additives. The coemployment of transesterification catalysts is, of course, possible and is recommended in cases where the desired stoving temperature is not quite attained.

Aqueous solutions or dispersions of the compositions of the present invention can be applied by conventional methods, such as roller coating, dipping, or spraying, mainly in the coating of metals. The preferred use is the cathodic electrodeposition. Normally aqueous solutions or dispersions with a solids content of from 5 to 25% are used. The principle, the mechanism, and the conditions for cathodic deposition are known. Cure of the coatings is effected in a period of from 15 to 30 minutes at from 150°-200° C. The preferred curing temperatures lie between 160 and 180° C. The cured films show a highly smooth surface, good resistance to solvents, good flexibility, and an extraordinary corrosion protection.

SPECIFIC EMBODIMENTS OF INVENTION

The following examples illustrate the invention without limiting its scope. Percentages, unless otherwise stated, refer to weight. The given characteristic values are determined according to DIN standards. The values all refer to resin solids. The following preparations are carried out in normal reactors with stirrer, heating means, thermometer, reflux or distillation condensor, and inert gas supply.

Reaction Partners

Component A 1: 62 g of a polypropyleneglycol diglycidylether (epoxy equivalent weight=310) and 392 g of a bisphenol-glycidylether (epoxy equivalent weight=490) are dissolved in 90 g of ethyleneglycolmonoethylether. At 60° C. 126 g of diisopropanolamine are added. The temperature is raised to 120° C. within 1 hour and held for another hour. The reaction product has an amine value of 90 mg KOH/g and a hydroxyl value of 400 mg KOH/g.

Component A 2: 190 g bisphenoldiglycidyl ether (1 epoxy equivalent) and 1425 g bisphenolglycidylether (3 epoxy equivalents) are dissolved at 100° C. in 597 g ethyleneglycol monoethylether. The solution is cooled to 60° C. and 126 g diethanolamine are added. The temperature is slowly raised to 80° C. within 2 hours. Then, 196 g N,N-diethylpropane diamine-1,3 are added and the temperature is raised to 120° C. within 2 hours. At this temperature, 478 g of a $C_9$–$C_{11}$-carboxylic acid glycidylester, the carboxy group of which is attached to a tertiary carbon atom, are added and the batch is held at 130° C. for 5 hours, while stirring. The batch is diluted to 65% with ethyleneglycolmonoethylether. The resin, based on 100% solids, has an amine number of 91 mg KOH/g and a hydroxyl value of 265 mg KOH/g.

Component A 3: 190 g bisphenoldiglycidylether (1 epoxy equivalent) and 1425 g bisphenoldiglycidylether (3 epoxy equivalents) are dissolved at 100° C. in 600 g diethylene glycol diethylether. The solution is dissolved at 60° C. and 400 g diethanolamine are added. The batch is heated to 120° C. within 2½ hours and held for another hour at 120° C. to complete the reaction. 485 g ε-caprolactone are added, and the batch is held for 6 hours at 130° C. Then it is diluted with ethyleneglycol monoethylether to 65%. The amine value of the resin, based on 100% solids, is 92 mg KOH/g, and the hydroxyl value is 365 mg KOH/g.

Component A 4: 2 g azobisisobutyronitrile are dissolved in 40 g isopropanol by warming to provide a clear solution. The clear solution is raised to reflux temperature (about 84° C.), and a monomer blend of 20 g glycidylmethacrylate, 20 g hydroxyethylmethacrylate, and 40 g 2-ethylhexyl-acrylate in which 2 g azobisisobutyronitrile are clearly dissolved are added continuously within 2 hours. The reaction mass is stirred at reflux temperature for 3 hours. A homogeneous solution of 16 g diisopropanolamine in 20 g butylglycol is quickly added at 85° C., then the batch is stirred for 2 hours at 90° C. The product is diluted at 90° C. with 13 g ethyleneglycolmonobutylether, and at 40° C. with 10 g acetone. The resin has a solids content of 57%, an amine value of 58 mg KOH/g, and a hydroxyl value of 250 mg KOH/g.

Component A 5: 330 g linseed oil, 180 g of a polyglycidylether of a phenol novolak (epoxy equivalent ca. 180) and 1420 g of a bisphenoldiglycidylether (epoxy equivalent ca. 475) are dissolved in 400 g dipropyleneglycolmonomethylether (DPM). To the solution, turbid at this time, 83 g (1.2 equivalents) of diethylamine are added at 60° C, the temperature being held below 70° C. by cooling. After 1 hour 169 g of N,N-diethylpropane diamine-1,3 (2.6 equivalents) are added and the temperature is allowed to rise to 120° C. In this phase, the reaction product becomes clear, establishing a reaction between the linseed oil and the amine modified epoxy resin. After a reaction time of an additional hour, the batch is diluted at 120° C. with DPM to a solids content of 70%. The resin has a hydroxyl number of 114 mg KOH/g and an amine value of 98 mg KOH/g.

Component A 6: To 100 g of p-tert. butylphenol and 120 g aqueous formaldehyde solution (36%) 10 g of a 40% aqueous sodium hydroxide solution are slowly added at 30° C. The batch is held at room temperature for 48 hours until the content of free formaldehyde has fallen to a constant level. After thoroughly admixing with 12 g of a 33% solution of hydrochloric acid, the non-aqueous layer is separated and the resin is washed with deionized water until no chloride ions can be traced. The yield is about 160 g of a resol resin. 32 g of the resol resin obtained and 131 g of component A 4 are partially condensed at 80° C. for 5 hours until the product can be diluted with water without coagulation upon neutralization with acetic acid. The product has a solids content of 62%, a hydroxyl number of 354 mg KOH/g, and an amine value of 44 mg KOH/g.

Component A 7: 190 g bisphenoldiglycidylether (1 epoxy equivalent) and 1425 g bisphenoldiglycidylether (3 epoxy equivalents) are dissolved in 400 g ethylhexanol at 100° C. The solution is cooled to 60° C. and 160 g diisopropanolamine are added. In the course of 2 hours the temperature is slowly raised to 80° C., 132 g N,N-dimethylpropane diamine-1,3 are added, and the temperature is raised to 120° C. within 2 hours. At this temperature, 480 g of a $C_9$-$C_{11}$-carboxylic acid glycidylether with the carboxy groups linked to a tertiary C-atom are added and the batch is held at 130° C. for 5 hours while stirring. The product has a hydroxyl value of 209 mg KOH/g and an amine value of 84 mg KOH/g.

Component B 1: As an example of a simple diester, diethylmalonate is used. This diester can be employed as available, or prepared according to methods known from literature. It can be obtained, for example, through condensation of ethanol with the potassium salt of cyanoacetic acid using a concentrated acid as a catalyst.

Component B 2: As an example of a polyfunctional ester as a crosslinking component, a transesterification product of 396 g dimethylmalonate and 134 g trimethylolpropane with 1.1 g zinc octoate (8% metal) is prepared. The blend is reacted for about 10 hours at 130° C., while about 90 g methanol are distilled off. The polyfunctional ester is a water-white liquid with a hydroxyl number of 16 mg KOH/g.

Component B 3: 465 g of bisphenoldiglycidylether (epoxy equivalent ca. 195) are reacted at 130° C. with 268 g dimethylol propionic acid until an acid value of below 3 mg KOH/g (hydroxyl value ca. 490) is obtained. 260 g of 2-ethyl hexanol and 640 g malonic acid diethyl ester are added and held at 140°-160° C. until 180 g of ethanol have distilled off. Index n in the aforesaid general formula is 4 for this pro- duct.

Component B 4: 140 g of 2,2-dimethyl-1,3-propane diol, 134 g trimethylol propane, 74 g n-butanol, and 660 g malonic acid dimethylester are slowly heated to 130° C. in a reaction vessel equipped with a fractionating column until 190 g of methanol have distilled off. The composition corresponds to an index n of 2 to 3 in the aforesaid general formula.

Component B 5: 480 g malonic acid diethylester and 134 g trimethylolpropane are heated to 130° C. While monitoring the reaction by the refractive index and with slow temperature rise to 165° C., 135 g of ethanol are distilled off. Further volatile components are distilled off at 160° C., with rising vacuum, until the solids content of the reaction mass has reached 95% non-volatile substance after 30 minutes at 120° C.

EXAMPLES

Examples 1-5

The binder compositions of the invention are prepared through mixing of components (a) and (b) at 50° C. according to the following table.

| Example | Component (a) | Component (b) | Solids Content Of Blend (%) | Ratio Of (a):(b) (100% Solids) |
|---|---|---|---|---|
| 1 | 100 A 3 | 35 B 1 | 74 | 65:35 |
| 2 | 123 A 2 | 20 B 2 | 70 | 80:20 |
| 3 | 100 A 5 | 30 B 4 | 77 | 70:30 |
| 4 | 146 A 6 | 10 B 3 | 64 | 90:10 |
| 5 | 163 A 1 | 7 B 4 | 59 | 93:7 |

Example 6

2787 g of the modified epoxy resin solution obtained according to component A 7 are mixed with 590 g of component B 5 at 100° C. for 2 hours. In a second mixing vessel, 65 g formic acid (85% in water) and 4800 g deionized water are mixed thoroughly with a high speed stirrer. While still stirring, the blend of components A 7 and B 5 is added continuously within 1 hour. A milky emulsion results. Optionally, the solids content may be adjusted to 35% by adding more water. 343 g of the emulsion are ground on a pearl mill together with 30 g titanium dioxide pigment, 30 g aluminum silicate pigment, 0.6 g carbon black, and 1 g lead octoate (30% metal) to give a pigment paste with a content of volatile organic substances of 0.14 kg/liter of solids volume. The pigment paste is diluted to 18% solids by adding water.

Evaluation Of The Binders

Each 300 g resin solids of the binder compositions 1-5 were milled with 87 g titanium dioxide, 60 g aluminum silicate, and 3 g carbon black. After dispersion of the pigments, the acid used for protonizing was added and the paste was diluted with deionized water to a solids content of 15%. For Examples 1, 4, and 5, in addition, transesterification catalysts were admixed homogeneously. With direct current applied to the electrodeposition bath, coatings were deposited over a period of 2 minutes on zinc phosphated steel panels wired as the cathode, the bath temperature being 25° C., and the deposition current being between 100 and 250 volts. The coated substrates were rinsed with water and cured at the given conditions. Average film thickness of the cured films was 15 to 19 μm. Application conditions, measured values, and evaluation results are listed in the following table.

TABLE I

| Ex. | Catalyst (1) | Acid | Degree Of Neutralization (2) | pH-Value | Film Thickness | Cure min/°C. | Hardness (3) | Indentation (4) | Salt Spray Test (5) |
|---|---|---|---|---|---|---|---|---|---|
| 1 | Pb | formic acid | 50% | 6.1 | 18 μm | 20/180 | 185 | 6.8 | 1000 |
|   |   |   |   |   |   | 30/160 | 180 | 6.0 | 850 |
| 2 | — | lactic acid | 80% | 5.2 | 17 μm | 20/180 | 180 | 7.0 | 1000 |
|   |   |   |   |   |   | 30/160 | 170 | 5.5 | 750 |
| 3 | — | acetic acid | 45% | 6.1 | 17 μm | 20/180 | 160 | 7.2 | 900 |
|   |   |   |   |   |   | 30/160 | 145 | 7.3 | 800 |

TABLE I-continued

| Ex. | Catalyst (1) | Acid | Degree Of Neutralization (2) | pH-Value | Film Thickness | Cure min/°C. | Hardness (3) | Indentation (4) | Salt Spray Test (5) |
| --- | --- | --- | --- | --- | --- | --- | --- | --- | --- |
| 4 | Pb | formic acid | 40% | 6.0 | 19 μm | 20/180 | 190 | 6.5 | 900 |
|   |   |   |   |   |   | 30/160 | 170 | 6.5 | 800 |
| 5 | Ti | acetic acid | 50% | 5.4 | 20 μm | 20/180 | 150 | 7.8 | 800 |
|   |   |   |   |   |   | 30/160 | 142 | 7.4 | 600 |

(1) Ti: titaniumacetylacetonate
Pb: lead octoate
Level: 0.5% metal on 100 g binder solids
(2) Theoretical percentage of the neutralized amine groups of the binder
(3) König Pendulum Hardness DIN 53 157 (seconds)
(4) Erichsen Indentation DIN 53 156 (mm)
(5) Salt Spray ASTM B-117-64: maximum 2 mm corrosion at cross-incision after the indicated hours As will be apparent to one skilled in the art, various modifications can be made within the scope of the aforesaid description. Such modifications being within the ability of one skilled in the art form a part of the present invention and are embraced by the appended claims.

It is claimed:

1. Heat-hardenable cationic binders comprising blends of amine group carrying polymers and a cross-linking component which is film-forming with said polymer through transesterification at elevated temperature and which is water-dilutable upon protonation of the amine groups comprising
  (a) 60 to 95% by weight of a polymer having a hydroxyl value of from 40 to 450 mg KOH/g and an amine value of from 20 to 150 mg KOH/g, water-soluble or water-dilutable upon protonation of the basic groups of said polymer, and
  (b) 5 to 40% by weight of a cross-linking component of the general formula —

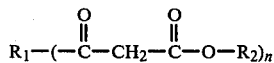

n having a value of from 1 through 5,
  $R_1$ being the moiety of a monoalcohol having from 1 to 8 C-atoms or of a polyol or of a polyamine or of a polyepoxy compound remaining after reaction with one or more carboxylic acid groups, and
  $R_2$ being a straight or branched chain alkyl radical with from 1 to 8 C-atoms.

2. Binders according to claim 1 wherein component (b) is a malonic acid ester having a boiling point of above 200° C.

3. Binders according to claims 1 or 2 wherein $R_1$ of component (b) is the moiety of a polyol of a low molecular weight polyester or polymer with chain end hydroxyl groups.

4. Binders according to claims 1 to 3 characterized in that component (b) has a molecular weight of up to about 5000 and an index n of between 2 and 5.

5. Process for crosslinking water-dilutable polymers having a hydroxyl number of 40 to 450 mg KOH/g and sufficient basic groups to render said polymer water-dilutable upon protonization, characterized in that as the crosslinking component 5 to 40% by weight, calculated on total binder solids, of a compound having the general formula —

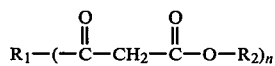

n having a value of between 1 and 5,
$R_1$ being the moiety of a monoalcohol with from 1 to 8 C-atoms or of a polyol or of a polyamine or of a polyepoxy compound remaining after reaction with one or more carboxylic acid groups, and
$R_2$ being a straight chain or branched alkyl radical with from 1 to 8 C-atoms,
are reacted with the protonized polymer.

* * * * *